H. C. Peirson,
Making Hoops.
Nº 23,389. Patented Mar. 29, 1859.
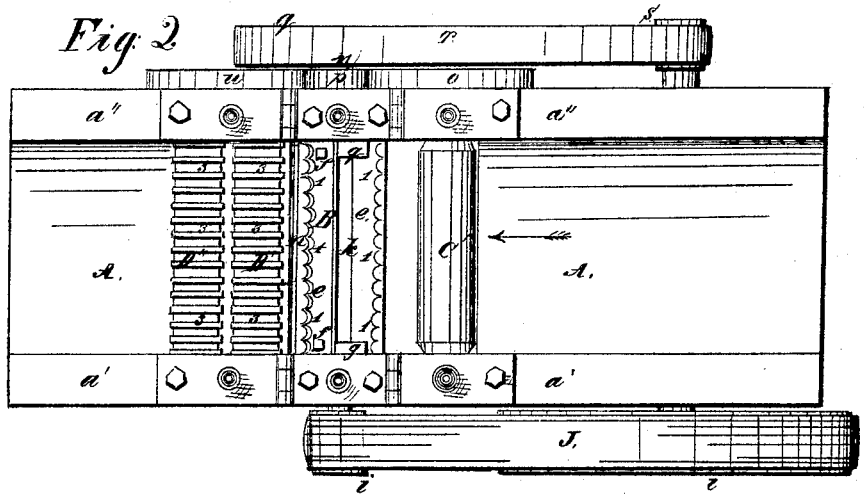
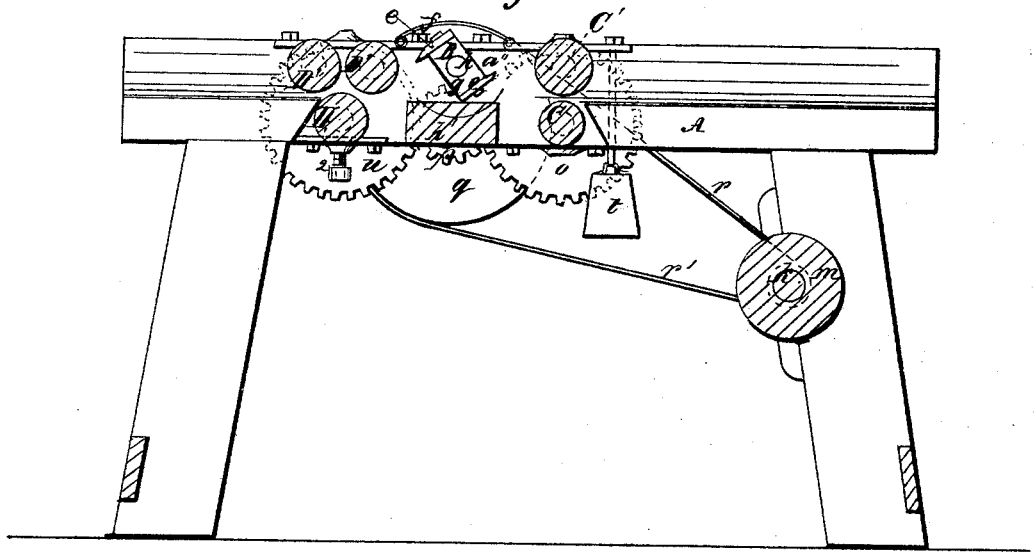
Witnesses:
Benj. Muiston
Jacob Peirson
Inventor:
Henry C. Peirson

UNITED STATES PATENT OFFICE.

HENRY C. PEIRSON, OF PHILADELPHIA, PENNSYLVANIA.

HOOP-MACHINE.

Specification of Letters Patent No. 23,389, dated March 29, 1859.

*To all whom it may concern:*

Be it known that I, HENRY C. PEIRSON, of the city of Philadelphia, in the State of Pennsylvania, have invented a new and Improved Hoop-Making Machine; and I do hereby declare that the following is a full, clear, and exact description of the construction and operation of the same, reference being had to the annexed drawings, making a part of this specification, in which—

Figure 1 is a vertical longitudinal section through its middle; and Fig. 2 a plan, or top view of the same, like letters indicating the same objects in both figures.

The nature of my invention consists in the arrangement of a series of bending rollers in rear of the cutter, so as to operate together upon the hoops, as the latter are passed from under the cutter, and render them more pliable or ready for use.

In the said drawings, A, represents the frame or table which supports the working parts; B, the rotary cutter; C and C′, the feed rollers; and D, D′, D″, the series of bending rollers.

The cutter (B) is placed transversely in the frame, as shown in the drawings, and consists of two, like steel cutting plates $e$, $e$, adjustably secured by screw bolts $f$, $f$, to the two opposite ends of two iron blocks $g$, $g$, which are fixed upon the shaft, $h$. The latter projects through and beyond the raised side, $a'$, of the frame and has a pulley $i$, fixed thereat whereby a rapid rotary motion (in the direction of the arrow) is given to the said cutter (B), through the band $j$, which connects it with the main driving shaft $k$, through the band wheel, $l$, which is fixed thereon—the said main shaft ($k$) being rotated by any suitable power through the pulley $m$. Each of the plates ($e$, $e$,) have their cutting edge formed so as to present a regular series of alternating, uniform curves and points, 1—1, whereby, during the rotary motion of the cutter (B), the board, out of which the hoops are to be made, is cut through as it passes beneath, into a number of separate strips; each of a uniform, segmental shape, transversely—or curved on the upper and flat on the lower side—so as to be properly adapted for barrel hoops without further dressing—the said cutter being so adjusted that, when rotating, the points of its cutting edges (1—1) shall just clear the upper side of the bed piece ($n$) beneath it.

The feed rollers (C and C′) are made and arranged, the one above the other, in the usual manner, the bottom one (C) being of iron and slightly grooved, longitudinally, around its periphery; and is rotated by means of the spur wheel, $o$, which is fast on its projecting journal and gears into a pinion, $p$, which, with a pulley, $q$, is fast on a short shaft $r$, which is adapted to rotate in the one side, $a''$, of the frame or table—the said pulley ($q$) being connected by a band, $r'$, with a small pulley, $s$, which is fixed on the projecting end of the main shaft, $k$. The roller (C′) is made of wood, and is caused to press downwardly upon the board (which is, in consequence, fed forward by the roller (C) to the cutter (B) by means of a weight, $t$, at each end, in the usual manner—well known in planing machines. The bending rollers (D, D′, D″,) are also placed transversely across the table (A)—the lower one (D) being of iron and smooth on its surface—or without grooves; the other two rollers (D′ D″) are made of wood, and placed a short distance apart, in the same horizontal plane with each other, and also parallel with the roller (D), and so that their lower surfaces may be about in the same horizontal plane with the upper surface of the lower one (D)—the said upper surface of the lower roller (D), and also that of the feed roller (C), being on a line with the upper side of the platform of the table (A) and the bed piece ($n$)—or only slightly above it, as seen in the drawings. This roller (D) is adjustable in height, or in its relation to the two rollers (D′ and D″) above it, by means of set screws, 2, or otherwise, and has a spur wheel, $u$, fixed on the end of its journal which projects through the side ($a''$), so as to gear into the pinion ($p$), and consequently this roller (D) will be rotated in the same direction as the feed roller (C). Each of the two rollers (D′ D″) are free to rotate, and have a series of grooves, 3—3, made transversely arround in their peripheries, which corresponds with those (1—1) in the cutter.

Operation: The board which is to be cut and divided into hoops, should be, in thickness, equal to, or not greater than, the depth of the curved recesses (1—1) in the cutting edges of the plates ($e$, $e$,) ; and, the machine being in motion, the operator lays the board flatly upon the platform of the table (A) and pushes it up so as to cause it to be drawn by the feed rollers (C, C′,) and fed under the cutter (B) which, rotating rapidly, cuts against the advancing motion of the said board, and so divides the same into hoops of the form specified; and each one of the said hoops, as they are formed, immediately enters its appropriate groove in the roller (D'), is bent upwardly against the same by the roller (D), and then downwardly by and beneath the roller (D'')— thus by this bending and rebending operation of the rollers (D, D' D'',) the hoops are rendered more pliable or better adapted for use.

It will be perceived that cast-hoops can, by the use of this machine operating as described, be made with greater rapidity than heretofore, of perfect uniformity in size and shape, and also, rendered pliable, or adapted for immediate or subsequent use, and all at one operation or passage through the machine; and that the machine is simple, inexpensive and not difficult to keep in order.

Having thus fully described my improved hoop-making machine, I proceed to state that, what I claim as new and desire to secure by Letters Patent, is—

The arrangement of the series of bending rollers (D, D', D''), or their equivalents, in rear of the cutter (B), or its equivalent, so as to operate upon the hoops substantially in the manner and for the purpose specified, as the said hoops pass between them directly from the said cutter.

HENRY C. PEIRSON.

Witnesses:
 BENJ. MORRISON,
 JACOB PEIRSON.